United States Patent
Kim et al.

(10) Patent No.: US 7,430,019 B2
(45) Date of Patent: Sep. 30, 2008

(54) APPARATUS TO IMPROVE IMAGE SHARPNESS ADAPTIVELY ACCORDING TO MULTI-VIDEO FORMATS AND METHOD THEREOF

(75) Inventors: Byeong-jin Kim, Suwon-si (KR); Hyo-jin Son, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 561 days.

(21) Appl. No.: 10/981,511

(22) Filed: Nov. 5, 2004

(65) Prior Publication Data
US 2005/0128357 A1 Jun. 16, 2005

(30) Foreign Application Priority Data
Dec. 15, 2003 (KR) ............ 10-2003-0091445

(51) Int. Cl.
- H04N 5/00 (2006.01)
- H04N 5/21 (2006.01)
- H04N 5/46 (2006.01)
- H04N 5/44 (2006.01)
- H04N 5/50 (2006.01)
- G06K 9/40 (2006.01)

(52) U.S. Cl. .............. 348/606; 348/625; 348/555; 348/556; 348/558; 348/725; 348/735; 382/261; 382/266

(58) Field of Classification Search ......... 348/625, 348/606, 555, 556, 558, 725, 735, 705, 706; 382/261, 262, 266
See application file for complete search history.

(56) References Cited

U.S. PATENT DOCUMENTS

| | | | | | |
|---|---|---|---|---|---|
| 5,321,511 | A | * | 6/1994 | Min | 348/625 |
| 5,457,546 | A | * | 10/1995 | Hong | 358/447 |
| 5,920,357 | A | * | 7/1999 | Ohara | 348/625 |
| 6,215,527 | B1 | * | 4/2001 | Okamoto et al. | 348/625 |
| 6,570,673 | B2 | * | 5/2003 | Kishimoto | 358/1.2 |

(Continued)

FOREIGN PATENT DOCUMENTS

JO 2001-094998 4/2001

(Continued)

Primary Examiner—Brian P Yenke
(74) Attorney, Agent, or Firm—Stanzione & Kim, LLP

(57) ABSTRACT

An apparatus to improve an image sharpness and a method thereof which can improve the image sharpness of an image through an adaptive operation of the apparatus according to resolutions of input/output video signals and an emphasis of edge portions of the image. The apparatus to improve the image sharpness includes a plurality of band pass filters to respectively extract preset different frequency bands from a first video signal converted and inputted according to a video format of a display device, a filter selection part to select and operate at least one of the plurality of band pass filters, at least one first differentiator to differentiate video signals outputted from the selected band pass filters, at least one second differentiator to second-differentiate the differentiated video signals outputted from the first differentiators, at least one amplifier to amplify the second-differentiated video signals of the at least one second differentiator according to a preset amplification factor and to output a second video signal, and an adder to invert the second video signal, and adding the inverted second video signal to the first video signal to output an added video signal as the output video signal.

31 Claims, 3 Drawing Sheets

U.S. PATENT DOCUMENTS

| | | | |
|---|---|---|---|
| 6,618,097 B1 * | 9/2003 | Yamada | 348/625 |
| 6,873,372 B2 * | 3/2005 | Hachiya et al. | 348/625 |
| 7,023,495 B2 * | 4/2006 | Miki et al. | 348/584 |
| 7,154,561 B2 * | 12/2006 | Jeong | 348/625 |
| 2002/0176022 A1 | 11/2002 | Ahn | |
| 2003/0107678 A1 * | 6/2003 | Lin et al. | 348/630 |

FOREIGN PATENT DOCUMENTS

| | | |
|---|---|---|
| JP | 10-126748 | 5/1998 |
| KR | 1994-19284 | 8/1994 |
| KR | 1997-63913 | 11/1997 |

* cited by examiner

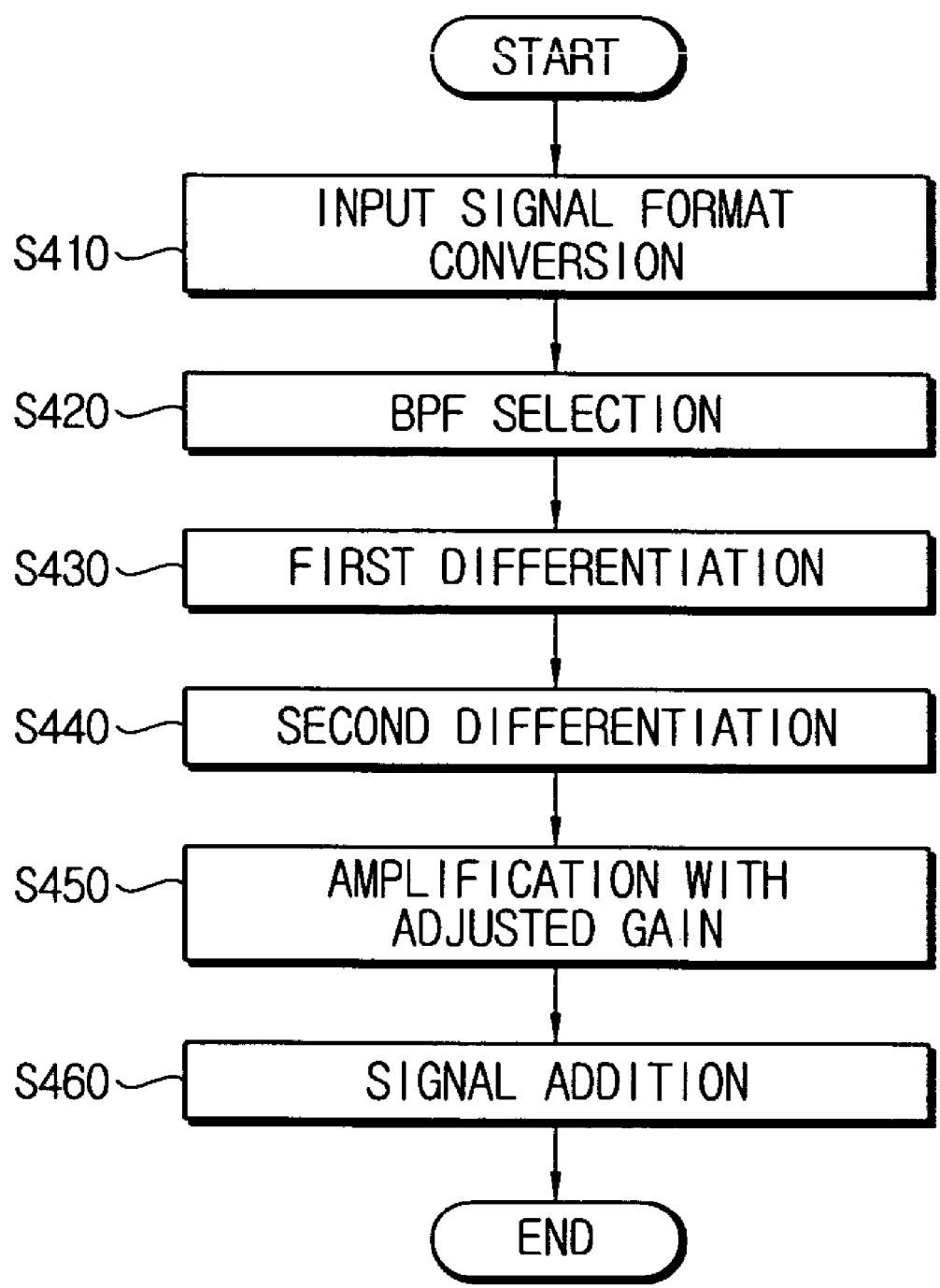

APPARATUS TO IMPROVE IMAGE SHARPNESS ADAPTIVELY ACCORDING TO MULTI-VIDEO FORMATS AND METHOD THEREOF

CROSS-REFERENCE TO RELATED APPLICATIONS

This application claims benefit under 35 U.S.C. § 119 from Korean Patent Application No. 2003-91445, filed on Dec. 15, 2003, the entire content of which is incorporated herein by reference.

BACKGROUND OF THE INVENTION

1. Field of the Invention

The present invention relates to an apparatus to improve an image sharpness adaptively according to multi-video formats and a method thereof, and more particularly, to an apparatus to improve an image sharpness and a method thereof which can improve the image sharpness adaptively according to video formats of an input video signal and an output video signal using a plurality of band pass filters.

2. Description of the Related Art

An image-sharpness improving apparatus is an apparatus capable of presenting a vivid image by improving a sharpness of the image. In an image acquiring or transmitting procedure, a noise may be introduced, or deterioration of a picture quality, such as image blurring, may occur. In this case, the sharpness of an image can be improved by emphasizing edge components of the image, and this causes the picture quality of the image to be improved.

FIG. 1 is a block diagram illustrating a conventional apparatus for improving an image sharpness. Referring to FIG. 1, the conventional image-sharpness improving apparatus includes a format converter (F/C) 110, a band pass filter (BPF) 120, a first differentiator 130, a second differentiator 140, an amplifier 150 and an adder 160.

The format converter 110 is a kind of comb filter, which converts an input video signal to match a video format of a display device on which an image is to be displayed.

The band pass filter 120 passes only a preset frequency band of the converted video signal outputted from the format converter 110. The frequency band, which passes through the band pass filter 120, is changed according to a resolution of the input video signal and a video system which outputs the image, and thus the band pass filter 120 should also be changed according to the input video signal and the video system.

The first differentiator 130 detects edge portions of the image by differentiating an output signal of the band pass filter 120. The second differentiator 140 separates rising edges and falling edges from the edge portions detected by the first differentiator 130 by differentiating the video signal outputted from the first differentiator 130.

The amplifier 150 performs clipping and gaining of the secondly differentiated signal, and outputs a signal amplified with a preset amplification factor in order to adjust the image sharpness according to the video system.

The adder 160 inverts an output signal of the amplifier 150, and adds the inverted signal to an original signal (converted video signal) outputted from the format converter 110. Accordingly, an output signal of the adder 160 becomes smaller than the original signal just before the rising edge, and becomes larger than the original signal just after the rising edge. Also, the output signal of the adder 160 becomes larger than the original signal just before the falling edge, and becomes smaller than the original signal just after the falling edge. Accordingly, the edge portions of the image are emphasized, and thus the image having an improved sharpness can be obtained.

For example, in a general NTSC type video system having a horizontal resolution of 480i, the sharpness improving apparatus operates in a manner that it extracts a low-frequency band of 2.5 MHz through the band pass filter 120, and slightly emphasizes the edge portions by setting a low gain for the sharpness.

Specifically, in the NTSC type video system, a maximum resolution of the video signal is 4.2 MHz, and thus a high-frequency range over 4.2 KHz corresponds to noise components. In practice, home VTRs or LDPs have low frequency bands. For example, a Hi8 or S-VHS type VTR has a frequency band of about 5 MHz, a typical VHS type VTR has a frequency band of about 3 MHz, and an LDP has a frequency band of about 5 MHz. Accordingly, the sharpness improving apparatus should use the band pass filter 120 having a low-frequency band in order to prevent high-frequency noise components from being emphasized.

Also, in an analog video system having much interference caused by external noises, a gain of the amplifier 150 for the sharpness is set low so as to prevent even external noise components from being emphasized.

In an ATSC type video system, such as an HDTV, having a horizontal resolution of 1080i, the maximum resolution of the video signal is five times higher than that of the NTSC type video system having the maximum resolution of 22 MHz. Thus, the ATSC type video system uses the band pass filter 120 having a high-frequency band to an extent of about 12 MHz to improve the sharpness, and the gain of the amplifier 150 is set pretty high to sharpen the image. The digital video system is not greatly affected by the external noise even if the gain of the amplifier is heightened, and thus the gain of the amplifier is set high in order to sufficiently improve the sharpness.

Meanwhile, in a video system having a horizontal resolution of 1080P (Progressive), the horizontal resolution is more than 40 MHz, which is twice the horizontal resolution of 1080i, and thus the band pass filter 120 should use the high-frequency band of about 30 MHz.

Accordingly, the conventional sharpness improving apparatus cannot be compatibly applied to both the NTSC type video system and the ATSC type video system, but should be separately applied to the video system in accordance with a type of the video system.

For example, in the sharpness improving apparatus for an analog video system, since the sharpness of the signal having passed through the low-frequency band pass filter of 2.5 MHz is emphasized, the sharpness of the high-frequency band, which is to be emphasized with respect to the video signal for the HDTV system of a high picture quality, cannot be improved, but a low-frequency noise of the 2.5 MHz frequency band is emphasized instead. Also, if an analog NTSC video signal is inputted to the sharpness improving apparatus for the HDTV system, a signal having passed through the high-frequency band pass filter of 12 MHz is emphasized with a high gain, and this causes the image having an emphasized high-frequency noise to be outputted without emphasizing the edge portions of the image.

Consequently, the conventional sharpness improving apparatus has the problems in that it performs a proper operation with respect to a video format having a constant resolution, and thus cannot operate adaptively according to multi-video formats having different resolutions.

SUMMARY OF THE INVENTION

In order to solve the foregoing and/or other problems, it is an aspect of the present general inventive concept to provide an apparatus to improve an image sharpness and a method thereof which can improve a picture quality by improving the image sharpness adaptively according to video formats of an input video signal and an output video signal and by adjusting a gain of an amplifier.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an apparatus to improve an image sharpness, the apparatus comprising a plurality of band pass filters to respectively extract preset different frequency bands from a first video signal converted and inputted according to a video format of a display device, a filter selection part to select and operate at least one of the plurality of band pass filters, at least one first differentiator to differentiate video signals outputted from the selected band pass filters, at least one second differentiator to differentiate the video signals outputted from the first differentiators, at least one amplifier to amplify the differentiated video signals according to a preset amplification factor, and to output a second video signal, and an adder to invert the second video signal and to add the inverted second video signal to the first video signal to output an added video signal.

In an aspect of the present general inventive concept, the apparatus may further include a storage part to store a preset selection list to select the at least one of the plurality of band pass filters according to information about signals before and after format conversion of the first video signal, that is, information on video formats corresponding to the first video signal and/or the output signals outputted from the selected band pass filters. It may also be possible that the selection list is set by a user, and the apparatus may further include a gain adjustment part to adjust a gain of the second video signal of the amplifiers.

In another aspect of the present general inventive concept, the gain adjustment part may adjust the gain according to the information about the signals before and after the format conversion of the first video signal, and the gain adjustment part may adjust the gain according to a kind of the display device to which the video signal is to be outputted. The information is a resolution of each signal.

The foregoing and/or other aspects of the present general inventive concept may also be achieved by providing a method of improving an image sharpness, the method comprising selecting at least one of a plurality of band pass filters to respectively extract preset different frequency bands from a first video signal converted and inputted according to a video format of a display device, differentiating respective video signals outputted from the selected band pass filters, second-differentiating the respective differentiated video signals, amplifying the respective second-differentiated video signals according to a preset amplification factor to output a second video signal, and inverting the second video signal and adding the inverted second video signal to the first video signal to output an added video signal.

In an aspect of the present general inventive concept, the method may further include storing a preset selection list to select the at least one of the plurality of band pass filters according to information about signals before and after format conversion of the first video signal, that is, information on video formats corresponding to the first video signal and/or the output signals outputted from the selected band pass filters. It is also possible that the selection list is set by a user.

In another aspect of the present general inventive concept, the method may further include adjusting a gain of the second signal of the amplifiers, and adjusting the gain according to the information about the signals before and after the format conversion of the first video signal, that is, information on video formats corresponding to the first video signal and/or the output signals outputted from the selected band pass filters.

In yet another aspect of the present general inventive concept, the adjusting of the gain may comprises adjusting the gain according to a kind of the display device to which the added video signal is to be outputted, and the information is a resolution of the signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 4 is a flowchart illustrating a method of a sharpness improving apparatus according to another embodiment of the present general inventive concept.

DETAILED DESCRIPTION OF THE PREFERRED EMBODIMENTS

Figure 1:
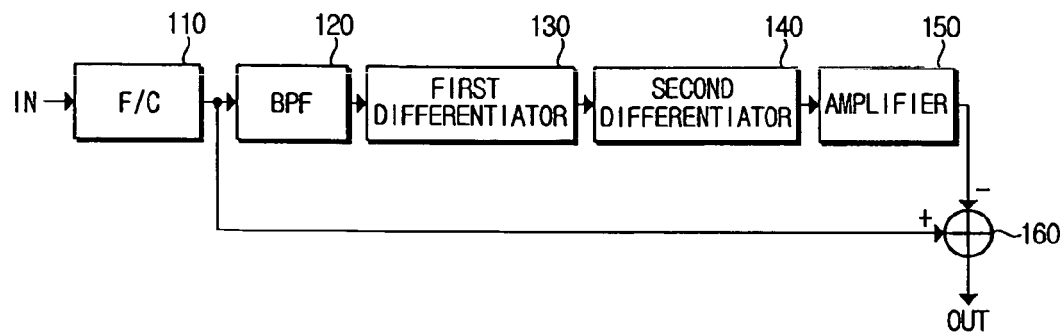
FIG. 1 is a block diagram illustrating a conventional apparatus for improving an image sharpness.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The matters defined in the description such as a detailed construction and elements are nothing but the ones provided to assist in a comprehensive understanding of the invention. Thus, it is apparent that the present general inventive concept can be carried out without those defined matters. Also, well-known functions or constructions are not described in detail since they would obscure the invention in unnecessary detail.

Figure 2:
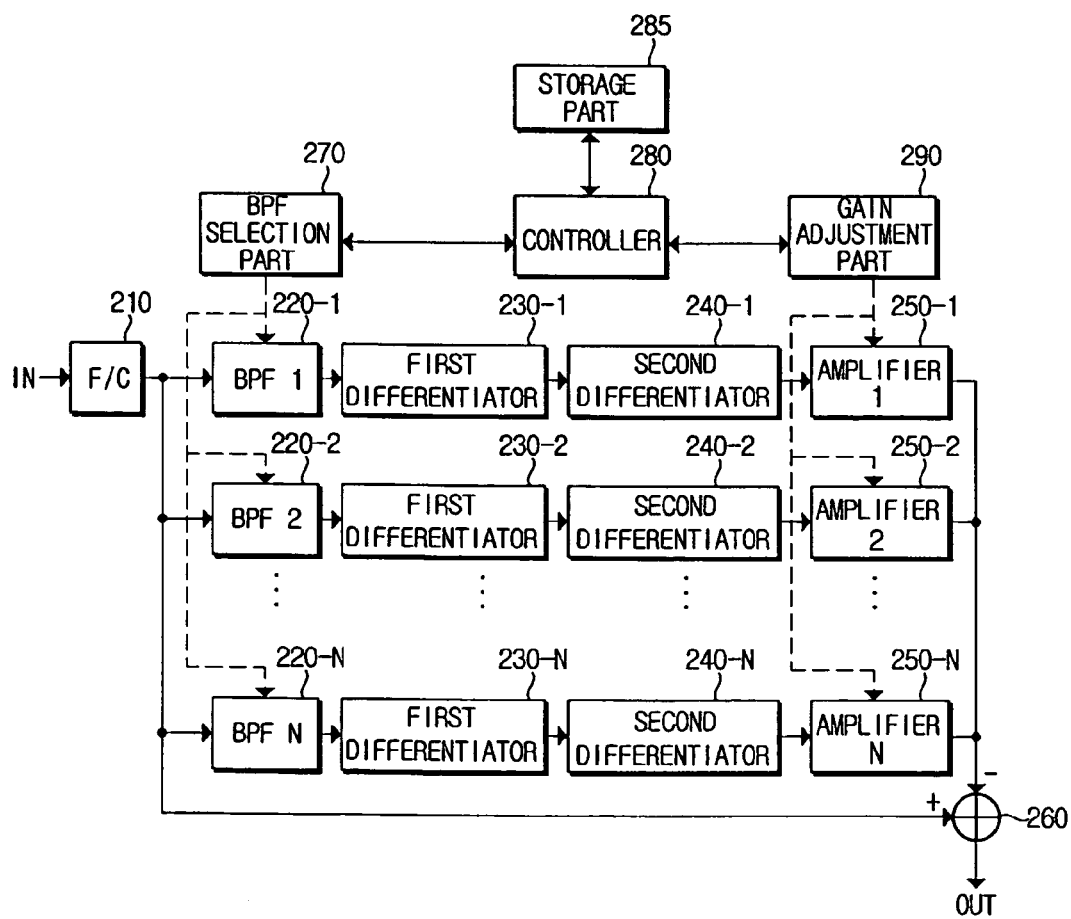
FIG. 2 is a block diagram illustrating an apparatus to improve an image sharpness according to an embodiment of the present general inventive concept.

FIG. 2 is a block diagram illustrating an apparatus to improve an image sharpness according to an embodiment of the present general inventive concept.

Referring to FIG. 2, the sharpness improving apparatus may include a format converter (F/C) 210, a plurality of band pass filters (BPFs) 220-1 to 220-N, a plurality of first differentiators 230-1 to 230-N, a plurality of second differentiators 240-1 to 240-N, a plurality of amplifiers 250-1 to 250-N and an adder 260. The sharpness improving apparatus may further include a filter (BPF) selection part 270, a controller 280, a storage part 285 and a gain adjustment part 290.

Figure 3:
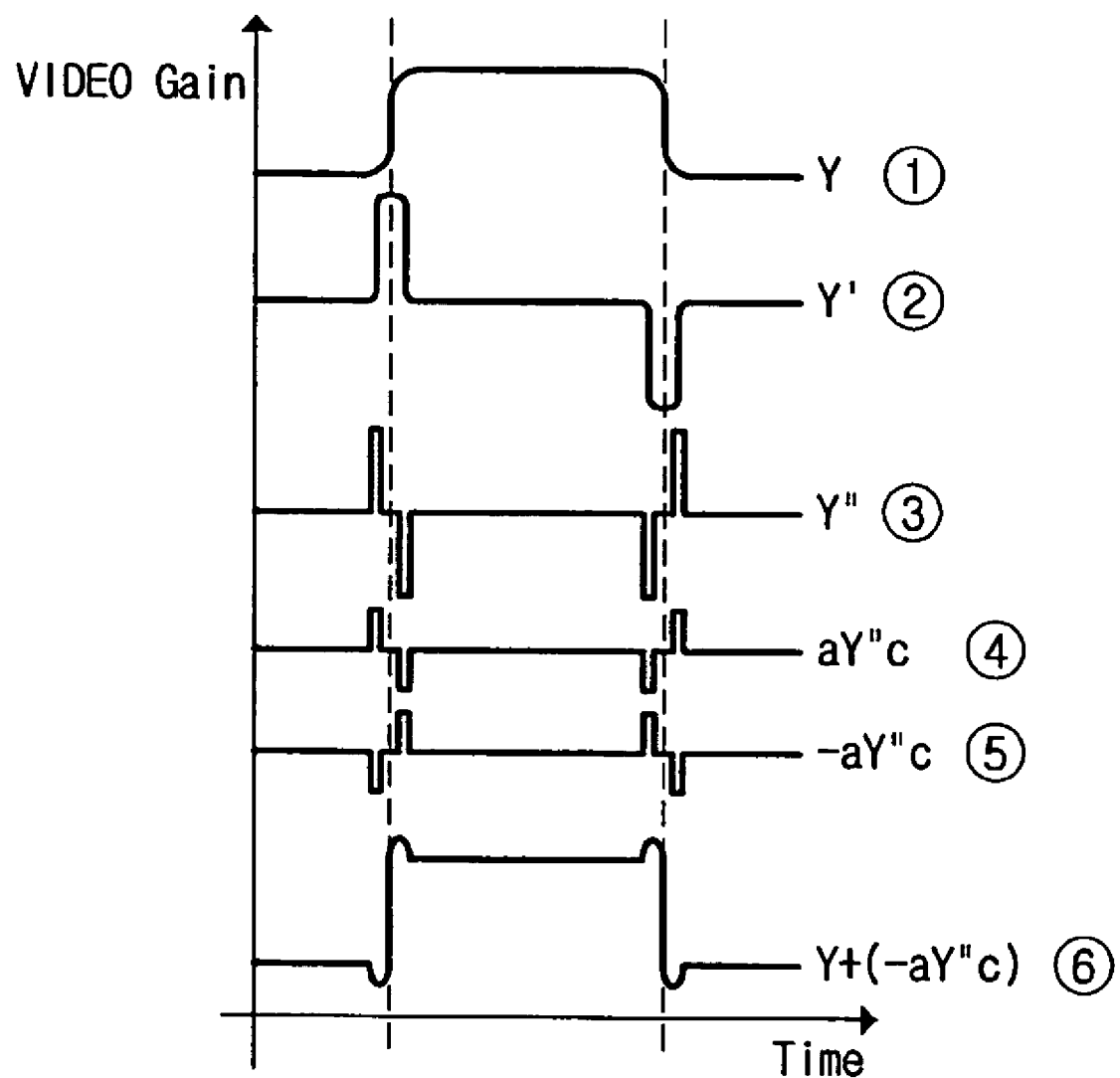
FIG. 3 is a graph illustrating waveforms of signals generated from the sharpness improving apparatus of FIG. 2.

FIG. 3 is a graph illustrating waveforms of signals generated according to an operation of the sharpness improving apparatus of FIG. 2. Hereinafter, the sharpness improving apparatus will be explained with reference to FIGS. 2 and 3.

The format converter 210 may be a kind of a comb filter, which converts an input video signal into a first video signal to match a video format of a display device on which an image corresponding to an output video signal is to be displayed.

The band pass filters 220-1 to 220-N can pass only preset frequency bands of the first video signal outputted from the format converter 210. The band pass filters 220-1 to 220-N can pass corresponding ones of different frequency bands (preset frequency bands), and at least one of them can be selected to pass the corresponding frequency band according to resolutions of the input and output video signals. Specifically, at least one of the band pass filters 220-1 to 220-N can be selectively used according to the video signals and the video system. Signals outputted from corresponding ones of the band pass filters 220-1 to 220-N may have a waveform of "Y(1)" in FIG. 3. The selection of the band pass filters 220-1 to 220-N will be explained later.

The plurality of first differentiators 230-1 to 230-N correspond to the band pass filters 220-1 to 220-N, respectively, and can detect edge portions of the image by differentiating signals outputted from the band pass filters 220-1 to 220-N. The signals outputted from the first differentiators 230-1 to 230-N may have a waveform of "Y'(2)" in FIG. 3. The second differentiators 240-1 to 240-N can separate rising edges and falling edges from the edge portions detected by the first differentiators 230-1 to 230-N by second-differentiating the signals outputted from the corresponding first differentiators 230-1 to 230-N. The signals outputted from the second differentiators 240-1 to 240-N may have a waveform of "Y"(3)" in FIG. 3.

The amplifiers 250-1 to 250-N, which correspond to the second differentiators 240-1 to 240-N, can perform clipping and gaining of the second-differentiated signals outputted from the second differentiator 240-1 to 240-N, and can output signals (second video signal) amplified according to a preset amplification factor in order to adjust the image sharpness according to the video system. The signals outputted from the amplifiers 250-1 to 250-N may have a waveform of "aY"c(4)" in FIG. 3. The gains of the amplifiers 250-1 to 250-N can be adjusted according to the resolution of the input video signal and the video system. The gain adjustment of the amplifiers 250-1 to 250-N will be explained later.

The adder 260 can invert the output signals (second video signal) of the amplifiers 250-1 to 250-N, and can add the inverted signals to the original signal (first video signal Y'(1)) outputted from the format converter 210. The inverted signals may have a waveform of "−aY"c(5)" in FIG. 3. A signal (output video signal) outputted from the adder 260 may have a waveform of "Y+(−aY"c)(6)" in FIG. 3. Referring to FIG. 3, the output signal (output video signal) of the adder 260 can become smaller (lower) than the original signal (first video signal) just before the rising edge and can become larger (higher) than the original signal just after the rising edge. Also, the output signal of the adder 260 can become larger (higher) than the original signal just before the falling edge and can become smaller (lower) than the original signal just after the falling edge. Accordingly, the edge portions of the image can be emphasized, and thus an image having an improved sharpness can be obtained.

Meanwhile, the filter selection part 270 can select at least one of the band pass filters 220-1 to 220-N, which pass the proper frequency bands according to information about the format of the input video signal and the format of the output video signal to be outputted.

The gain adjustment part 290 can adjust the gains of the amplifiers 250-1 to 250-N according to the information about the resolution of the input video signal and the video system, i.e., the format of the input video signal and the format of the output video signal.

The controller 280 can control the filter selection part 270 to select at least one of the band pass filters 220-1 to 220-N, which pass corresponding ones of the proper frequency bands. The controller 280 can also control the gain adjustment part 290 to adjust the gains of the amplifiers 250-1 to 250-N.

In an aspect of the present general inventive concept, the controller 280 may use a lookup table stored in the storage part 285. This lookup table may include a selection list which shows the selection of the band pass filters 220-1 to 220-N and the gain adjustment of the amplifiers 250-1 to 250-N according to signal format information such as resolutions of the input and output video signals. The gain adjustment part 290 may adjust the gains of the amplifiers 250-1 to 250-N using the lookup table or select the gains set by the user.

In the lookup table, the proper frequency bands of the band pass filters 220-1 to 220-N and the proper gains of the amplifiers 250-1 to 250-N can be preset and stored to correspond to the resolution difference according to the video formats of the input video signal and the output video signal. This lookup table may be set or changed by the user.

For the optimized sharpness improvement according to diverse input and output formats, different band pass filters can be adopted, and the gain should also be properly adjusted. For example, band pass filters of 2.5 MHz can be adopted in the NTSC system, and band pass filters of 5 to 6 MHz can be adopted in the video system having a resolution of 480p.

Also, band pass filters of 12 MHz can be adopted in the video system having a resolution of 1080i, and band pass filters of 30 MHz can be adopted in the video system having a resolution of 1080p.

Accordingly, by pre-storing proper information obtained through experiments according to respective variables corresponding to the resolution, the input and output video signals, the video format, and/or the video system, in the lookup table, a rapid and effective operation of the sharpness improving apparatus can be achieved according to an aspect of the present general inventive concept.

Also, it is possible that the list of the lookup table can be directly changed by the user, or can be varied according to a desired sharpness using a menu.

Examples of the lookup table are shown in Table 1 and Table 2 below. Table 1 shows 25 kinds of cases according to the resolutions of the input and output formats of the input and output video signals, and Table 2 includes methods of selecting band pass filters and adjusting gains according to the cases in Table 1. In the embodiment of the present general inventive concept, five examples of the input and output formats are presented.

TABLE 1

|  | 480i | 480p | 720p | 1080i | 1080p |
|---|---|---|---|---|---|
| 480i | case 1 | case 2 | case 3 | case 4 | case 5 |
| 480p | case 6 | case 7 | case 8 | case 9 | case 10 |
| 720p | case 11 | case 12 | case 13 | case 14 | case 15 |
| 1080i | case 16 | case 17 | case 18 | case 19 | case 20 |
| 1080p | case 21 | case 22 | case 23 | case 24 | case 25 |

In Table 1, a vertical axis (column) refers to the resolution of the input video signal according to an input format of the input video signal, and a horizontal axis (column) refers to the resolution of the output video signal according to an output format of the output video signal. Accordingly, Table 1 shows the number of all possible cases according to the resolutions of the input and output formats of the video signal.

TABLE 2

|  | Filter 1 (2.5 MHz) | Filter 2 (5.5 MHz) | Filter 3 (10 MHz) | Filter 4 (12 MHz) | Filter 5 (30 MHz) |
| --- | --- | --- | --- | --- | --- |
| Case 1 | 4 | 3 | 1 | 1 | 1 |
| Case 2 | 4 | 5 | 3 | 3 | 1 |
| Case 3 | 1 | 2 | 4 | 5 | 2 |
| . | . | . | . | . | . |
| . | . | . | . | . | . |
| . | . | . | . | . | . |
| Case 23 | 2 | 4 | 6 | 7 | 4 |
| Case 24 | 2 | 3 | 5 | 7 | 5 |
| Case 25 | 3 | 4 | 6 | 6 | 7 |

Here, it is exemplified that the number "N" of band pass filters is 5. In Table 2, the vertical axis refers to the cases according to the input/output formats as shown in Table 1, and the horizontal axis refers to band pass filters 1 to 5, i.e., 220-1 to 220-5. The numbers of the respective entry indicate gains of the amplifiers 250-1 to 250-5 which correspond to the respective band pass filters 220-1 to 220-5.

The controller 280 can determine the corresponding case from Table 1 by combining the resolution information of an input image (input video signal) to be inputted to the format converter 210 and the resolution information of an output image (output video signal) to be outputted to the display device, and can transmit control signals to the filter selection part 270 and the gain adjustment part 290 with reference to Table 2 in order to select the band pass filter and adjust the gain for the corresponding case.

Accordingly, the filter selection part 270 can select at least one of the band pass filters 220-1 to 220-N according to the resolution information of the input image and the resolution information of the output image to be outputted. Also, the gain adjustment part 290 can adjust the gains of the amplifiers 250-1 to 250-N according to the resolution information of the input image and the resolution information of the output image to be outputted.

In Table 1, both the resolution of the input video signal and the resolution of the output video signal, which correspond to the case 1, can be 480i. Accordingly, referring to Table 2, in the case 1, the gains of the signals outputting from the band pass filters 1 and 2, i.e., 220-1 and 220-2, and having the low-frequency bands can be set to "4" and "3" respectively, and the gains of the signal outputted from the band pass filter 3 to 5, i.e., 220-3 to 220-5, and having the high-frequency bands can be set to "1" to cause no signal to be amplified. This is because the frequency of the maximum resolution of a typical analog video signal having the input/output resolution of 480i is about 4.2 MHz. Thus, a high-frequency noise can be emphasized if the high frequency of more than 10 MHz is amplified. However, the high-frequency noise can be prevented from being emphasized since the high-frequency bands are not emphasized.

Also, in Table 1, both the resolution of the input video signal and the resolution of the output video signal, which correspond to the case 25, can be 1080p. Accordingly, referring to Table 2, in the case 25, the maximum gain can be set with respect to the signal outputted from the band pass filter 220-5 which passes the high-frequency band. That is the gains of the signals outputted from the band pass filters 1 and 2, i.e., 220-1 and 220-2, can be set to "3" and "4", respectively, and the gain of the signal outputted from the band pass filter, which pass the low-frequency band, can be set low. This is because the horizontal resolution of the video signal having a high input/output resolution of 1080p is more than 40 MHz. Thus, a sharper image can be obtained by emphasizing edges of the video signal by increasing the gain of the band pass filter using the high-frequency band of 30 MHz.

According to an aspect of the present general inventive concept, at least one of the band pass filters 220-1 to 220-N can be selected according to the information about the resolution of the input video signal and the resolution of the output video signal, and the sharpness of the image can be improved adaptively according to the input/output video signals by properly adjusting the gains of the video signals outputted from the selected band pass filters.

Also, the selection of the optimum band pass filter and the gain adjustment, which are obtained through experiments using the resolution information of the input video signal, can be promptly applied to all corresponding cases, and thus the sharp image can be outputted without any picture deterioration.

Table 3 below corresponds to Table 1 that is a lookup table used for adjusting the gains of the signals outputted from the respective band pass filters of the sharpness improving apparatus, according to the kind of a display device on which the output video signal (output image) is displayed. Table 3 is a lookup table obtained by modifying the gains in Table 2.

TABLE 3

|  | CRT under 29" | CRT over 29" | PDP | CRT PROJ. | DLP PROJ. |
| --- | --- | --- | --- | --- | --- |
| Case 1 | −0.5 | 0 | +1 | +0.5 | +0.5 |
| Case 2 | −0.5 | +0.5 | +1 | +0.5 | +0.5 |
| . | . | . | . | . | . |
| . | . | . | . | . | . |
| . | . | . | . | . | . |
| Case 24 | +0.5 | +1 | +1.5 | +0.5 | +1 |
| Case 25 | +0.5 | +1 | +2 | +1 | +1.5 |

If the display device is provided as a separate system, such as a set-top box, in a case that a degree of sharpness improvement is adjusted according to the resolutions of the input/output images using a lookup table, it is possible to more minutely adjust the sharpness according to the separate display device.

This is because the effect of the sharpness improvement can be changed in accordance with not only the resolution of the input or output image according to the display device but also a screen size of the display device. For example, if the screen size of the display device is large, a minuter sharpness adjustment can be required. Also, the result of sharpness application may be changed according to the kind of the display device, such as a panel.

For example, a projection television receiver (TV) may generally have a screen size larger than that of a CRT TV, but its picture quality can be lower than that of the CRT TV. Also, a picture quality of a CRT projection TV can be lower than that of a DLP projection TV. Also, it is possible to give weight values to values of the lookup table according to all the variables, such as the picture quality, brightness, etc.

Referring to Table 3, in a case that the display device is a CRT TV having a size of less than 29 inches, the gain can be adjusted by subtracting a weight value of "0.5" from the gain values of the signals outputted from the respective band pass filters in Table 2, which correspond to the case 1 having 480i as both the resolutions of the input video signal and the output video signal in Table 1. In the same manner, "1" is added in a case of a PDP, and "0.5" is added in a case of the CRT projection TV or the DLP projection TV.

As the screen size of the display device become larger, it can be necessary to improve the sharpness of the image. The weight values as shown in Table 3 may serve just as an example, and thus they can diversely be applied to the sharpness improving apparatus through experiments or according to the user's demand.

FIG. 4 is a flowchart illustrating an operation of a sharpness improving apparatus according to another embodiment of the present general inventive concept. Hereinafter, the operation of the sharpness improving apparatus according to the embodiment of the present general inventive concept will be explained with reference to FIGS. 2 through 4.

The format converter 210 can convert an input video signal to match a video format of a display device on which an image corresponding to an output video signal is to be displayed (operation S410). The filter selection part 270 can select at least one of the plurality of band pass filters 220-1 to 220-N according to the information about the formats of the input video signal and the output video signal to be outputted, and the selected band pass filters pass the predetermined frequency bands of a first video signal outputted from the format converter 210 (operation S420).

The controller 280 can control the filter selection part 270 so that the filter selection part 270 selects at least one of the plurality of band pass filters 220-1 to 220-N using the lookup table stored in the storage part 285 to transmit corresponding ones of the frequency bands. The frequency bands passing through the band pass filters 220-1 to 220-N can be different from one another, and can be applied in a different manner according to the resolution of the input video signal and the video system.

The plurality of first differentiators 230-1 to 230-N, which correspond to the band pass filters 220-1 to 220-N, respectively, can detect edge portions of the image by differentiating the output signals of the band pass filters 220-1 to 220-N (operation S430).

Then, the plurality of second differentiators 240-1 to 240-N can separate rising edges and falling edges from the edge portions detected by the first differentiators 230-1 to 230-N by second-differentiating the output signals of the corresponding first differentiators 230-1 to 230-N (operation S440).

The gain adjustment part 290 can adjust the gains of the amplifiers 250-1 to 250-N according to the information about the resolution of the input video signal and the video system, i.e., the format of the input video signal and the format of the output video signal. The controller 280 can control the gain-adjustment operation of the gain adjustment part 290 using the lookup table stored in the storage part 285. Accordingly, the plurality of amplifiers 250-1 to 250-N, which correspond to the second differentiators 240-1 to 240-N, respectively, can output signals obtained by clipping and gaining the secondly differentiated signals according to the gain adjusted by the gain adjustment part 290 (operation S450).

The adder 260 can invert the output signals (second video signal) of the amplifiers 250-1 to 250-N, and can add the inverted signals to the original signal (first video signal) outputted from the format converter 210 (operation S460) to output the output video signal. The output video signal of the adder 260 becomes smaller than the original signal just before the rising edge, and becomes larger than the original signal just after the rising edge. Also, the output signal of the adder 260 becomes larger than the original signal just before the falling edge, and becomes smaller than the original signal just after the falling edge. Accordingly, the edge portions of the image can be emphasized, and thus an image having an improved sharpness can be obtained.

As described above, according to the sharpness improving apparatus according to an aspect of the present general inventive concept, at least one of the band pass filters can be selected according to information about resolutions of the input and output video signals, the gains of the video signals outputted from the selected band pass filters can be properly adjusted, and then the gain-adjusted video signals can be added to the input video signal. Accordingly, the sharpness of the image can be improved through an adaptive operation of the sharpness improving apparatus according to the resolutions of the input/output video signals and an emphasis of the edge portions of the image.

Also, the sharpness improving apparatus according to another aspect of the present general inventive concept can perform selection of the optimum band pass filters and gain adjustment, which can be obtained using lookup tables prepared through experiments or by the user, using the resolution information of the input video signal, and thus can output a clear image without any deterioration of a picture quality by adaptively adjusting a degree of sharpness improvement according to all cases, such as the resolution, size, etc., of the display device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to improve an image sharpness, comprising:
    a plurality of band pass filters to respectively extract preset different frequency bands from a first video signal converted and inputted from an input video signal according to a video format of a display device;
    a filter selection part to select and operate at least one of the plurality of band pass filters to output video signals;
    at least one first differentiator to differentiate the video signals outputted from the selected band pass filters;
    at least one second differentiator to second-differentiate the differentiated video signals outputted from the first differentiators;
    at least one amplifier to amplify the second-differentiated video signals of the at least one second differentiator with according to a preset amplification factor, and to output a second video signal;
    an adder to invert the second video signal, and to add the inverted second video signal to the first video signal to output an added video signal as an output video signal;
    a storage part to store a selection list to select the at least one of the plurality of band pass filters according to information on the input video signal and the output video signal such that the information comprises a resolution of each signal; and
    a controller which utilizes the selection list of the storage part to control the filter selection part regarding which at least one of the plurality of band pass filters should be selected for the input video signal.

2. The apparatus of claim 1, wherein the selection list is set by a user.

3. The apparatus of claim 1, further comprising:
    a gain adjustment part to adjust a gain of the second video signal of the amplifiers.

4. The apparatus of claim 3, wherein the gain adjustment part adjusts the gain according to information on the input video signal and the first video signal.

5. The apparatus of claim 3, wherein the gain adjustment part adjusts the gain according to a kind of the display device to which the added video signal is to be outputted.

6. The apparatus of claim 1, wherein the at least one first differentiator comprise the same number of differentiators as the plurality of band pass filters.

7. The apparatus of claim 1, wherein the at least one second differentiator comprises the same number of differentiators as the plurality of band pass filters.

8. The apparatus of claim 1, wherein the band pass filters are different from one another.

9. The apparatus of claim 1, wherein the band pass filters have corresponding ones of the preset different frequency bands.

10. The apparatus of claim 1, wherein the at least one amplifier comprises the same number of the plurality of the band pass filters.

11. The apparatus of claim 1, wherein the at least one amplifier amplifies the second-differentiated video signals according to a gain determined by a characteristic of the first video signal.

12. The apparatus of claim 1, wherein the at least one amplifier comprises a plurality of amplifiers having corresponding ones of gains to amplify the second-differentiated video signals outputted from the at least one second differentiator according to the corresponding gains.

13. The apparatus of claim 1, wherein the at least one amplifier comprises a plurality of amplifiers having corresponding ones of gains determined by at least one of characteristics of the input and output video signals.

14. The apparatus of claim 1, wherein the at least one amplifier comprises a first group of amplifiers having a first gain and a second group of amplifiers having a second gain according to a resolution of one of the first video signal and the output video signal.

15. The apparatus of claim 1, wherein the at least one amplifier comprises a first group of amplifiers having different gains and a second group of amplifiers having a same gain.

16. The apparatus of claim 1, wherein the first video signal comprises a plurality of frequency bands corresponding to the preset different frequency bands of the plurality of band pass filters, and the frequency bands of the first video signal are extracted by corresponding ones of the plurality of band pass filters.

17. The apparatus of claim 16, wherein signals of the extracted frequency bands of the first video signal are differentiated by the at least one first differentiator and the at least one second differentiator.

18. The apparatus of claim 17, wherein the differentiated signals of the extracted frequency bands of the first video signal are amplified by the at least one amplifier according to one or more gains corresponding to the respective frequency bands of the first video signal.

19. The apparatus of claim 18, wherein the at least one amplifier comprises a plurality of amplifier corresponding to the frequency bands of the first video signal.

20. The apparatus of claim 18, wherein the gains are determined by a format of one of the input and output video signals.

21. The apparatus of claim 18, wherein the gains are different from one another according to the extracted frequency bands of the first video signal.

22. The apparatus of claim 18, wherein at least two of the one or more gains are the same.

23. The apparatus of claim 18, wherein the gains comprise at least 5 gains corresponding to the frequency bands of the first video signal, and the at least 5 gains are determined by at least one of a resolution and a format of the added video signal.

24. The apparatus of claim 18, further comprising:
a display device to display an image corresponding to the output video signal thereon wherein the gains are determined according to a kind of the display device.

25. The apparatus of claim 1, further comprising:
a display device to display an image corresponding to the output video signal thereon, wherein the filter selection part selects the at least one of the plurality of band pass filters according to at least one of characteristics of the display device, the first video signal, and the output video signal.

26. A method of improving an image sharpness, the method comprising:
selecting at least one of a plurality of band pass filters to respectively extract preset different frequency bands from a first video signal converted and inputted according to a video format of a display device;
differentiating respective video signals outputted from the selected band pass filters;
second-differentiating the respectively differentiated video signals;
amplifying the second-differentiated video signals according to a preset amplification factor, and to output a second video signal;
inverting the second video signal, and adding the inverted second video signal to the first video signal to output an added video signal as an output video signal;
storing a selection list in a storage part to be utilized by a controller; and
controlling the selection of the at least one of the plurality of band pass filters by the controller according to information in the selection list and according to information on the input video signal and the output video signal such that the information comprises a resolution of each signal.

27. The method as claimed in claim 26, wherein the selection list is set by a user.

28. The method as claimed in claim 26, further comprising:
adjusting a gain of the second video signal of the amplifiers.

29. The method as claimed in claim 28, wherein the adjusting of the gain comprises adjusting a gain according to information on the first video signal and the output video signal.

30. The method as claimed in claim 28, wherein the adjusting of the gain comprises adjusting the gain according to a kind of the display to which the output video signal is to be outputted.

31. An apparatus to improve an image sharpness, comprising:
- a plurality of band pass filters to respectively extract preset different frequency bands from a first video signal converted and inputted from an input video signal according to a video format of a display device;
- a filter selection part to select and operate at least one of the plurality of band pass filters to output video signals;
- at least one differentiator and at least one amplifier to differentiate and to amplify, respectfully, a video signal output from the selected at least one of the plurality of band pass filters, and to output a second video signal;
- an adder to invert the second video signal, and to add the inverted second video signal to the first video signal to output an added video signal as an output video signal;
- a storage part to store a selection list to select the at least one of the plurality of band pass filters according to information on the input video signal and the output video signal such that the information comprises a resolution of each signal; and
- a controller which utilizes the selection list of the storage part to control the filter selection part regarding which at least one of the plurality of band pass filters should be selected for the input video signal.

* * * * *